(12) United States Patent
Brown et al.

(10) Patent No.: US 7,376,047 B2
(45) Date of Patent: May 20, 2008

(54) METHOD FOR PROCESSING AN ECHO PROFILE AND A PULSE-ECHO RANGING SYSTEM

(75) Inventors: Robert Brown, Peterborough (CA); Jean-René Larocque, Peterborough (CA)

(73) Assignee: Siemens Milltronics Process Instruments, Inc., Peterborough, Ontario (CA)

( * ) Notice: Subject to any disclaimer, the term of this patent is extended or adjusted under 35 U.S.C. 154(b) by 0 days.

(21) Appl. No.: 11/708,380

(22) Filed: Feb. 20, 2007

(65) Prior Publication Data

US 2007/0201309 A1    Aug. 30, 2007

(30) Foreign Application Priority Data

Feb. 21, 2006    (EP)    ................................. 06003515

(51) Int. Cl.
     *G01S 7/527*      (2006.01)
(52) U.S. Cl. ....................................................... 367/98
(58) Field of Classification Search ................... 367/98
See application file for complete search history.

(56) References Cited

U.S. PATENT DOCUMENTS

| | | | |
|---|---|---|---|
| 6,166,681 A | 12/2000 | Meszaros et al. | |
| 6,169,706 B1 | 1/2001 | Woodward et al. | |
| 6,298,008 B1 | 10/2001 | Lyon et al. | |
| 6,445,192 B1 | 9/2002 | Lovegren et al. | |

2007/0201309 A1*    8/2007    Brown et al. .................. 367/98

FOREIGN PATENT DOCUMENTS

EP      1821117 A1 *    8/2007

OTHER PUBLICATIONS

Billur Barshan; "Fast processing techniques for accurate ultrasonic range measurements"; Measurement Science and Technology; Jan. 2000; pp. 45-50; vol. 11, No. 1; ISSN: 0957-0233; XP 000945825; Bristol, Great Britain.
Billar Barshan and Roman Kuc; "Active Sonar for Obstacle Localization Using Envelope Shape Information"; Speech Processing 2, VLSI Underwater Signal Processing Toronto—May 14-17, 1991; International Conference on Acoustics, Speech & Signal Processing; IEEE; Apr. 14, 1991; pp. 1273-1276; vol. 2, Conf. 16; ISBN: 0-7803-0003-3; XP 010043256; New York, USA.

* cited by examiner

*Primary Examiner*—Daniel Pihulic

(57) ABSTRACT

Pulse-echo ranging system are used in level measurement applications for determining the distance to a target object by measuring how long after transmission of a pulse an echo pulse is received. An echo profile (17) is generated and then processed to determine the temporal position of the echo pulse on a temporal axis.

Based on the fact that the peak portion and the trailing edge of the echo profile are susceptible to be affected by the measurement environment and the target object itself, the accuracy in determining the echo arrival time is increased, by the steps of fitting a branch of a parabola (19) to a selected portion of the leading edge (18) of the echo profile (17) and determining the temporal position of the fitted parabola (19) on the temporal axis.

4 Claims, 2 Drawing Sheets

METHOD FOR PROCESSING AN ECHO PROFILE AND A PULSE-ECHO RANGING SYSTEM

CROSS REFERENCE TO RELATED APPLICATIONS

This application claims priority of European application No. 06003515.1 EP filed Feb. 21, 2006, which is incorporated by reference herein in its entirety.

FIELD OF INVENTION

The present invention relates to a method for processing an echo profile generated by a pulse-echo ranging system. It further relates to a pulse-echo ranging system.

BACKGROUND OF INVENTION

Pulse-echo ranging systems, also known as time-of-flight ranging systems, are commonly used in level measurement applications for determining the distance to an object (i.e. reflective surface) by measuring how long after transmission of a pulse the echo or reflected pulse is received. Such systems typically use ultrasonic pulses or pulse microwave (radar) signals in form of bursts of acoustic or electromagnetic energy.

Pulse-echo ranging systems generally have a transducer serving the dual role of transmitting and receiving the pulses, and a signal processor for detecting and calculating the position or range of the object based on the transit times of the transmitted and reflected pulses. The transducer employed in an acoustic pulse-echo ranging system typically includes an electro-mechanical vibrating element that functions as both a transmitter and a receiver. The transducer of a microwave pulse-echo ranging system typically includes a microwave transmitter/receiver antenna. Using the same transducer for transmitting as well as receiving is advantageous because the transducer will exhibit the same gain, directional characteristics etc. in both transmit and receive modes.

U.S. Pat. Nos. 6,169,706 and 6,298,008 describe methods of pulse-echo measurements in which a profile of the return echo signal is digitized, stored in memory and the stored echo profile is analyzed to determine the temporal position of the echo on a temporal axis, thus determining the distance to an object. In most conventional applications, the leading edge of the echo profile is located by identifying a point on the leading edge that is a certain level above the valley and below the peak of the echo profile. It is also known to use the trailing edge, the peak or the center of mass of the echo profile, especially when the leading edge is masked by another echo or distorted by the ring-down oscillations of the transducer. The ring-down results from stored energy being released by the transducer after excitation, and is particularly acute when the echo pulse has a low amplitude relative to the ring down pulses of the transducer, and also when the reflective surface is close to the transducer (near range).

It has turned out that the peak portion and the trailing edge of the echo profile are susceptible to be affected by the measurement environment and the target object itself, which makes it difficult to properly locate the echo arrival time and thus decreases the accuracy of measurement. For example, when monitoring the level of a liquid with a low dielectric constant, such as gasoline, in a tank, the echo pulse from the liquid level is harshly distorted by a strong echo coming shortly afterwards from the bottom of the tank. The lower the liquid level is, the more the echo from the level will get fused with the echo from the bottom.

Another example which requires a high accuracy of measurement is open channel monitoring, in which the measured level is used to calculate a flow volume in an open channel or pipe.

SUMMARY OF INVENTION

It is therefore an object of the invention to provide an improved echo processing with increased accuracy in determining the echo arrival time.

According to the invention this object is achieved by the method and a system defined in independent claims.

Preferred embodiments of the method and system according to the invention are specified in the dependent claims.

For determining the echo arrival time, only the leading edge of the echo profile is used by fitting a branch of a parabola to a selected portion of the leading edge and determining the temporal position of the fitted parabola on the temporal axis. The invention thereby makes use of the fact that the leading edge of the echo pulse is largely consistent when the distance of the target object and/or the intensity (i.e. amplitude or peak) of the echo vary. Thus, in the invention, the pulse shape, amplitude, width etc. are not of concern.

The most common mathematical method for finding the best-fitting curve, here the parabola with its parameters, to a given set of points, here the sample values of the leading edge of the echo profile, is the least-squares method, in which the sum of the squares of the offsets of the points from the curve is minimized.

When fitting the parabola to the leading edge, the width of the parabola can be allowed to vary with the optimization of other curve parameters of the parabola, i.e. its horizontal position and vertical position in an intensity-over-time diagram containing the echo profile. On the other hand, the method according to the invention proved to be more robust when using a parabola of known shape with fixed width and let only its horizontal position and vertical position for the optimization.

As already mentioned above, the leading edge can be distorted or masked by the ring-down oscillations of the transducer when the reflective surface is close to the transducer. For this reason, the new method of evaluating the leading edge is preferably performed for far ranges, where the pulse travel time is longer than the ring-down time, and in combination with another method to determine the temporal position of the echo pulse from the center of mass of the echo profile, wherein said another method is used for near ranges. A coarse estimation of the temporal position of the peak of the echo pulse can be sufficient to decide whether the echo pulse is in the far range or in the near range.

BRIEF DESCRIPTION OF THE DRAWINGS

The invention will be now described by way of a preferred example and with reference to the accompanying drawing, in which.

DETAILED DESCRIPTION OF INVENTION

Figure 1:
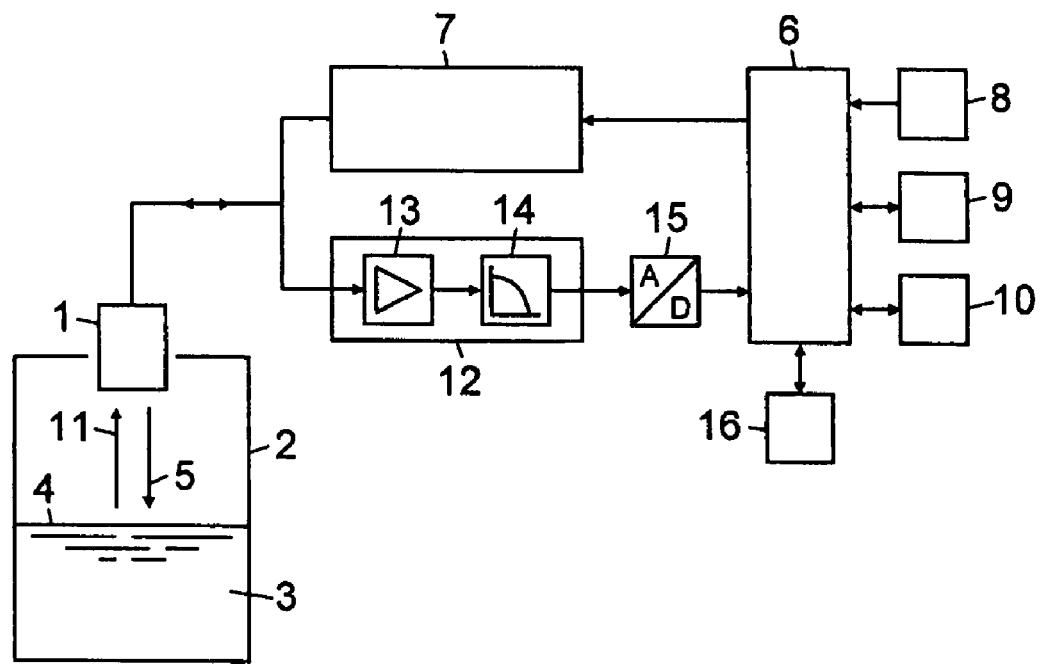
FIG. 1 shows a block diagram of the pulse-echo ranging system in accordance with the invention.

Reference is first made to FIG. 1 which shows a simplified schematic diagram of a pulse-echo ranging system. While the system and its operation are described in the context of an ultrasonic based pulse-echo acoustic ranging device, it should be understood that the system can also be radar based. The system comprises an ultrasonic transducer 1 which is installed in a tank 2 containing a liquid 3, or other type of material, with a level determined by the top surface 4 of the liquid 3. The top surface 4 of the liquid 3 provides a reflective surface which reflects the ultrasonic pulses 5 generated from the transducer 1. The transducer 1 is coupled to a microcontroller 6 through a transmitter 7. The microcontroller 6 operates under a control program stored in read-only memory (ROM) 8, utilizing parameters stored in non-volatile random access memory (NVRAM) 9, and provided with a working memory in the form of random access memory (RAM) 10. The microcontroller 6 controls the transmitter 7 to excite the transducer 1 to emit the ultrasonic pulses 5 at predetermined points in time and with a predetermined frequency and amplitude. The reflected or echo pulse 11 is received by the transducer 1 and converted into an electrical signal which is then fed to a receiver 12. The transmitter 7 and the receiver 12 can be implemented individually or be combined to form a transceiver. The receiver 12 comprises an amplifier 13 and an envelope detector 14 for amplifying and thereafter shaping the electrical signal output from the transducer 1. The output from the envelope detector 14 is then sampled and digitized by an analog-to-digital converter 15, from where the digital echo profile is stored in the RAM 10 for further processing by the microcontroller 6. The microcontroller 6 executes an algorithm which identifies and verifies the echo pulse 11 and calculates the range of the reflective surface 4, i.e. the time it takes for the reflected ultrasonic pulse 11 to travel from the reflective surface 4 to the transducer 1. From this calculation, the distance to the surface 4 of the liquid 3 and thereby the level of the liquid 3 is determined. An interface 16, which is also controlled by the microcontroller 6, provides for the export of data from the pulse-echo ranging system, and the import of operating parameters. Data may be exported in the form of a display, telemetry (e.g. bus) signals and/or alarm signals.

Figure 2:
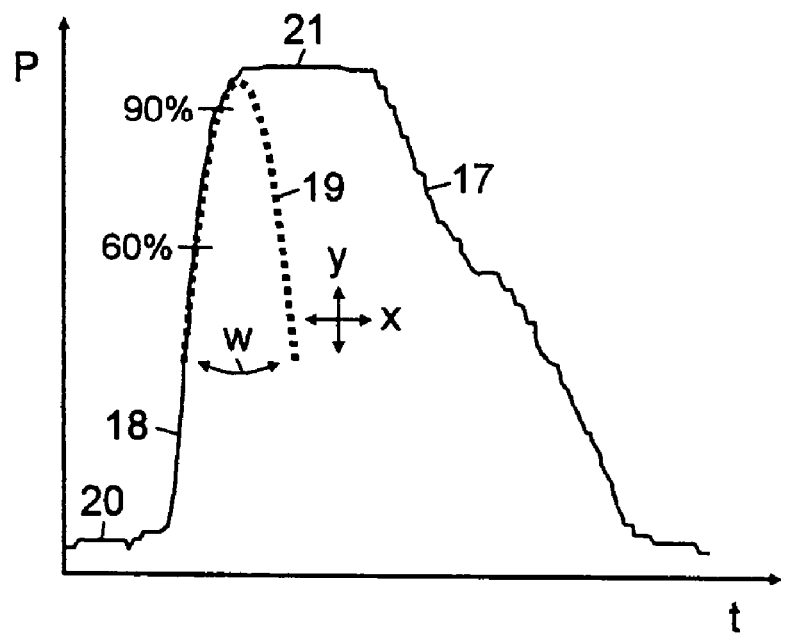
FIG. 2 shows an example for the fitting of the parabola to an echo profile.

The diagram of FIG. 2 shows, by way of example, the intensity P of the echo profile 17 as a function of time t. To determine the temporal position of the echo profile 17, the leading edge 18 of the echo profile 17 is identified in a first step. Then a portion of the leading edge 18 is extracted. This can be done by determining that portion of the echo's left-hand side that is between 60% and 90% with reference to the noise floor or valley 20 preceding the echo and the peak 21 of the echo. In a next step a least-square method is used to fit the branch of a parabola 19 to the selected portion of the leading edge 18, wherein the width w of the parabola 19 can be allowed to vary with the optimization of the horizontal position x and vertical position y of the parabola 19. Finally, the temporal position of the fitted parabola is determined as, e.g., the point on the parabola that is 30 dB below the peak of the fitted parabola.

Figure 3:
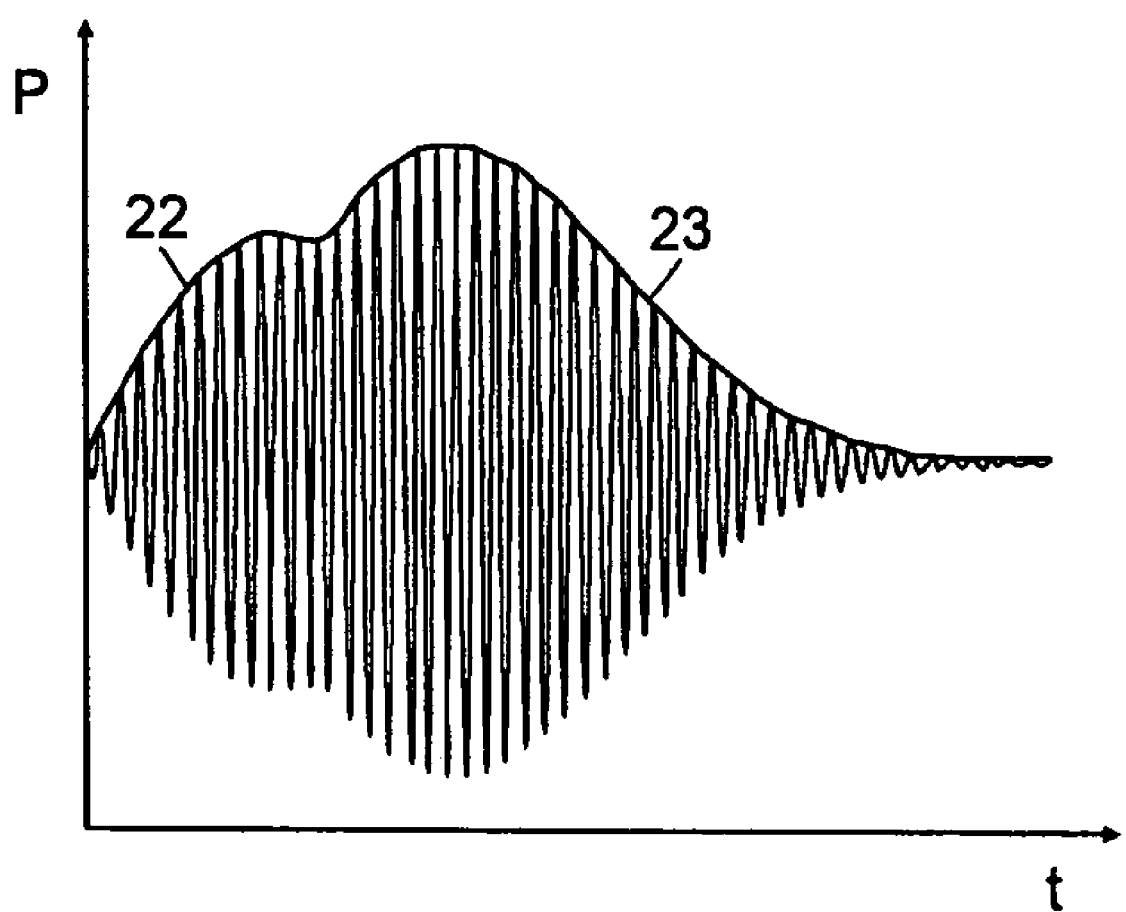
FIG. 3 gives an example for an echo pulse partially masked by another echo coming shortly afterwards.

FIG. 3 shows an echo pulse 22 the trailing edge of which is masked by another echo 23 coming shortly afterwards. This can happen in microwave pulse-echo ranging systems when the level of a liquid with a low dielectric constant is measured in a tank and when the echo pulse 22 from the liquid level is masked by a strong echo 23 coming shortly afterwards from the bottom of the tank. In this case, only an algorithm which evaluates the leading edge of the echo profile 22 can be performed to identify or localize the echo coming from the liquid level. Current algorithms, which evaluate the trailing edge, the peak or the center of mass of the echo profile, are unsuitable.

The invention claimed is:

1. A method for processing an echo profile generated by a pulse-echo ranging system to determine the temporal position of an echo pulse on a temporal axis, comprising:
   fitting a branch of a parabola to a selected portion of the leading edge of the echo profile;
   determining the temporal position of the fitted parabola on the temporal axis, wherein the width of the parabola is varied to fit the parabola to the selected portion of the leading edge, and wherein the determination of the temporal position of the fitted parabola on the temporal axis is applied for far ranges and for near ranges a determination of a temporal position of the echo pulse from the center of mass of the echo profile is used.

2. The method according to claim 1, wherein a temporal position of a peak of the echo pulse is evaluated to determine whether the echo pulse is in the far range or in the near range.

3. A pulse-echo ranging system for measuring a distance to a target object, comprising:
   a transmitter for controlling a transducer to emit at least one pulse of high frequency energy towards the target object;
   a receiver for receiving an echo pulse from a direction of the target object to the transducer to provide a echo profile; and
   a controller for determining the distance to the target object by evaluating the echo profile,
   wherein a branch of a parabola is fitted to a selected portion of a leading edge of the echo profile and a temporal position of the parabola on the temporal axis is determined,
   wherein a controller is programmed to fit the branch of the parabola, the controller is further programmed to vary the width of the parabola to fit the parabola to a selected portion of the leading edge, and
   wherein the parabola is used for far ranges and the controller is further programmed to determine the temporal position of the echo pulse from the center of mass of the echo profile for near ranges.

4. The pulse-echo ranging system as claimed in claim 3, wherein the controller is further programmed to evaluate the temporal position of the peak of the echo pulse to decide whether the echo pulse is in the far range or in the near range.

* * * * *